US005291674A

United States Patent [19]

Torrence

[11] Patent Number: 5,291,674

[45] Date of Patent: Mar. 8, 1994

[54] RECIRCULATING SNOWFALL-TYPE DISPLAY

[75] Inventor: Arthur L. Torrence, Newtown, Conn.

[73] Assignee: Mechtronics Corporation, Stamford, Conn.

[21] Appl. No.: 22,294

[22] Filed: Feb. 25, 1993

[51] Int. Cl.[5] ........................ C09F 19/00; A63H 3/52; A63H 33/40; A63H 33/26

[52] U.S. Cl. ........................ 40/410; 446/267; 446/179; 446/485

[58] Field of Search ............... 446/219, 267, 178, 179, 446/159, 485; 40/409, 410, 414, 443, 547, 406

[56] References Cited

U.S. PATENT DOCUMENTS

| | | | |
|---|---|---|---|
| 2,341,955 | 2/1944 | Smith | 40/410 X |
| 2,991,574 | 7/1961 | Trame | 40/406 |
| 3,071,888 | 1/1963 | Knott | 40/406 X |
| 4,170,035 | 10/1979 | Walker | 40/406 X |
| 4,643,693 | 2/1987 | Rubinstein | 40/406 X |
| 4,769,638 | 9/1988 | Woolfolk | 40/440 X |
| 4,928,412 | 5/1990 | Nishiyama | 40/409 X |
| 5,121,926 | 7/1992 | Pfaender | 40/547 X |
| 5,160,565 | 11/1992 | Chazalen et al. | 40/547 X |
| 5,200,239 | 4/1993 | Chen | 40/410 X |

FOREIGN PATENT DOCUMENTS

| | | | |
|---|---|---|---|
| 383013 | 10/1923 | Fed. Rep. of Germany | 40/409 |
| 1083064 | 9/1967 | United Kingdom | 40/410 |

*Primary Examiner*—David N. Muir

*Attorney, Agent, or Firm*—Haynes N. Johnson

[57] ABSTRACT

A display formed of two colorless, transparent plastic cylinders mounted concentrically with a vertical axis upon a base. The space between the two cylinders forms a tank which is filled with liquid and some plastic snowflakes having a slightly greater specific gravity than the liquid. An object to be displayed is positioned within the inner cylinder and, so, is not in contact with the liquid. The object and the liquid are illuminated by a light within the base. A motor operates a pump having an uncased spiral rotor projecting vertically downwardly into the liquid. Rotation of the pump causes a diffuse upward flow of the liquid and the snowflakes in the vicinity of the pump. Though this causes the snowflakes to move upwardly in a gentle and diffuse manner, this motion isn't particularly noticed by an observer. When the snowflakes reach the top of the liquid, they are diffused sidewardly and begin dropping, creating a snowfall effect.

10 Claims, 4 Drawing Sheets

RECIRCULATING SNOWFALL-TYPE DISPLAY

FIELD OF THE INVENTION

This invention relates to illuminated displays which can be used for advertising or for simple amusement, and is of the type which depicts snow or other flakes falling upon an object or through a scene. It has a system for recirculating the flakes which is not only substantially invisible to the viewer, but also adds to the reality of the snow scene.

BACKGROUND OF THE INVENTION

Devices which include a liquid in which flakes resembling snow fall slowly through a liquid are, of course, old. In these devices, the snow has to be recirculated by shaking or overturning the device periodically; any figure shown in the scene is positioned within the liquid.

In my device, the snow is recirculated by a type of pump which is within the scene, but is substantially invisible. Thus, the unit does not have to be turned or shaken to keep it operating. In addition, any figure or object depicted in the scene is not subject to contact with the liquid. This is valuable because, for example, when a bottle is being displayed, its label does not get constantly soaked, resulting in eventual deterioration.

BRIEF SUMMARY OF THE INVENTION

In the preferred form of my display, two colorless, transparent plastic cylinders are mounted concentrically, with their axes vertical, upon a base. The space between the two cylinders forms a tank which is filled with liquid and some plastic snowflakes or chips. The object to be displayed, such as a soda or beer bottle, is positioned within the inner cylinder and, so, is not in contact with the liquid. The object and the liquid are illuminated by a light within the base.

A lid is fitted over the cylinders and carries a motor which operates a pump with an uncased spiral rotor which projects vertically downwardly into the liquid. Rotation of the pump causes a diffuse upward flow of the liquid and the snowflakes in the vicinity of the pump. Though this causes the snowflakes to move upwardly, the motion is gentle and reminiscent of how a certain number of snowflakes move upward during a real snowstorm due to rising air currents. Consequently, the observer doesn't notice the recirculating effect which is taking place. When the snowflakes reach the top of the liquid, they are diffused sidewardly and begin dropping, creating a snowfall effect.

Normally the spiral rotor is in the rear of the device, and so is obscured by the bottle and by the refractive effects of the cylinders. As a result, it is substantially invisible and will not be seen or noticed unless one is carefully looking for it.

In a modification of my invention, a thin rectangular tank is used for the liquid and flakes, and the spiral pump is at one end. In this instance, the object to be viewed, such as a display card, is behind the unit. A similar effect is obtained.

DETAILED DESCRIPTION OF THE INVENTION

Figure 2:
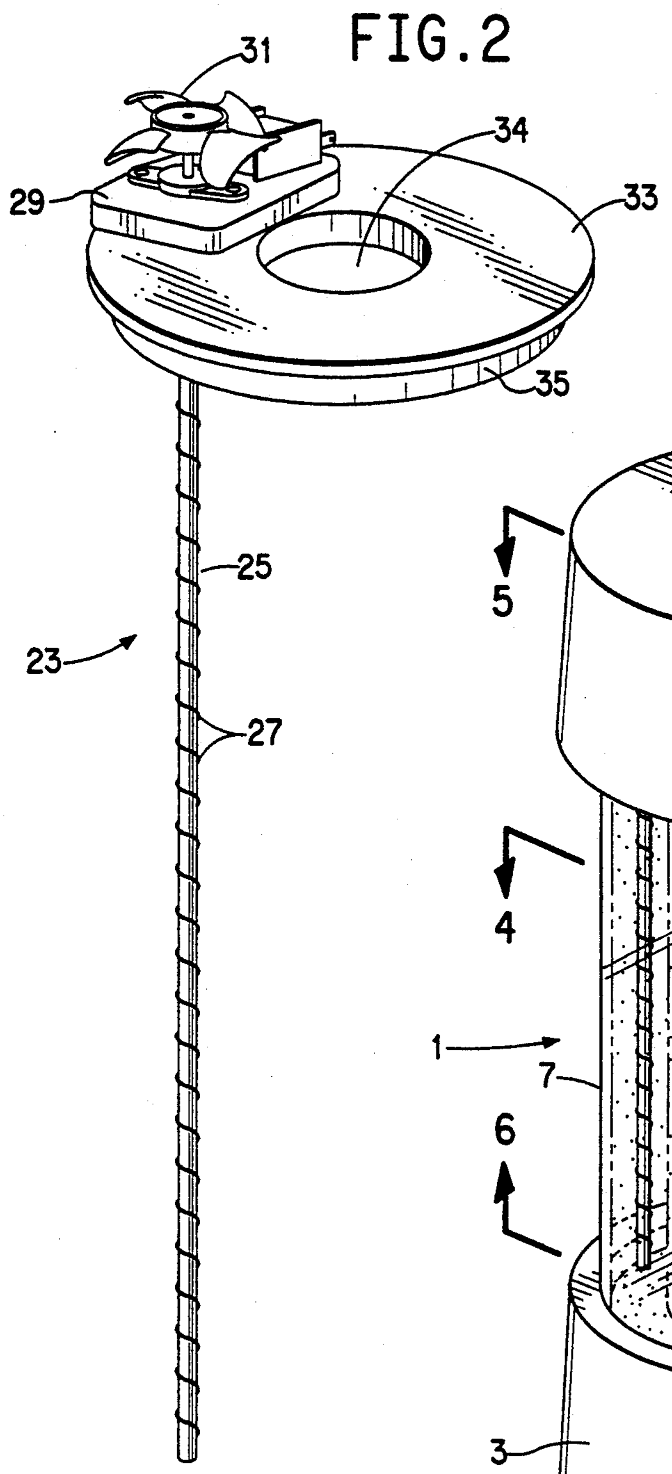
FIG. 2 is a perspective view of my spiral pump mechanism removed from the display and with the cover removed.
Figure 1:
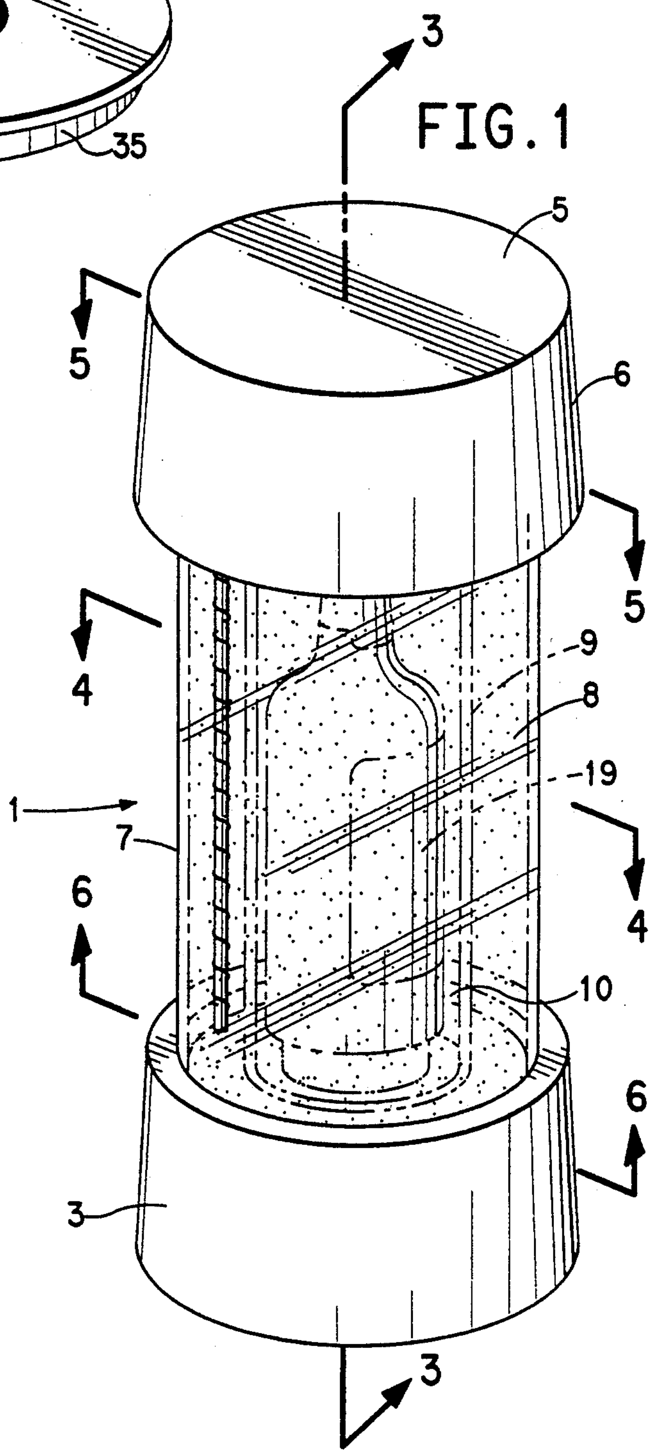
FIG. 1 is a perspective view of my invention in which two concentric plastic cylinders and a base form a cylindrical tank, with a central display area.
Figure 3:
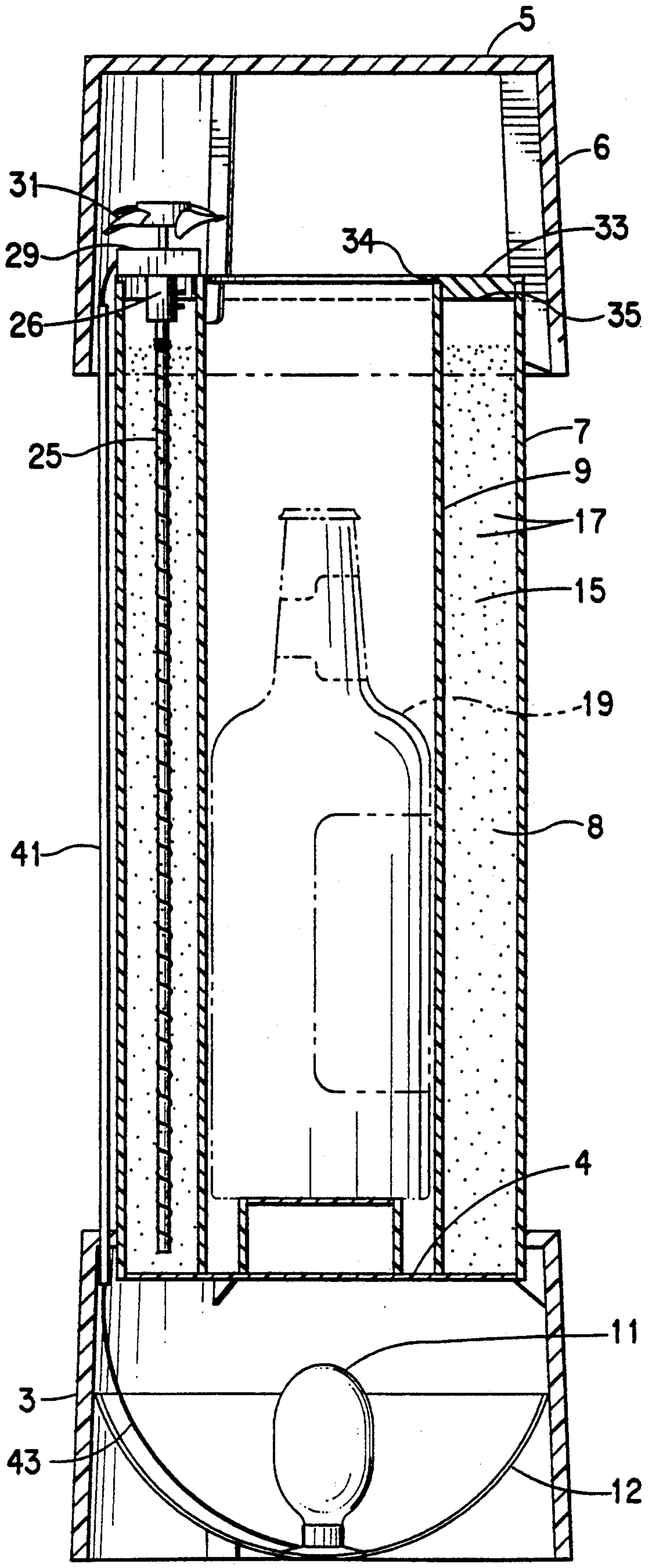
FIG. 3 is a vertical section taken on line 3—3 of FIG. 1.
Figure 4:
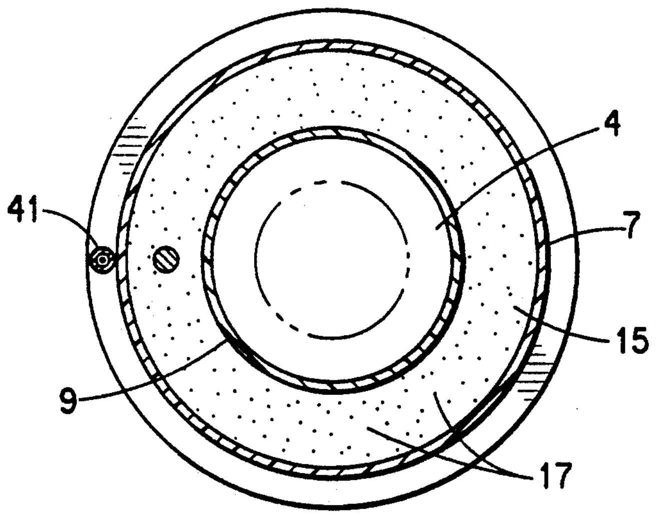
FIGS. 4, 5, and 6 are transverse sections taken on lines 4—4, 5—5, and 6—6, respectively of FIG. 1.
Figure 5:
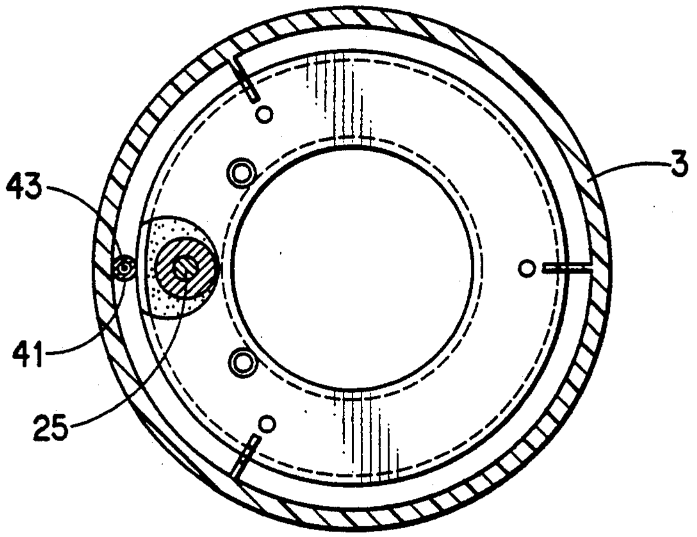
Figure 6:
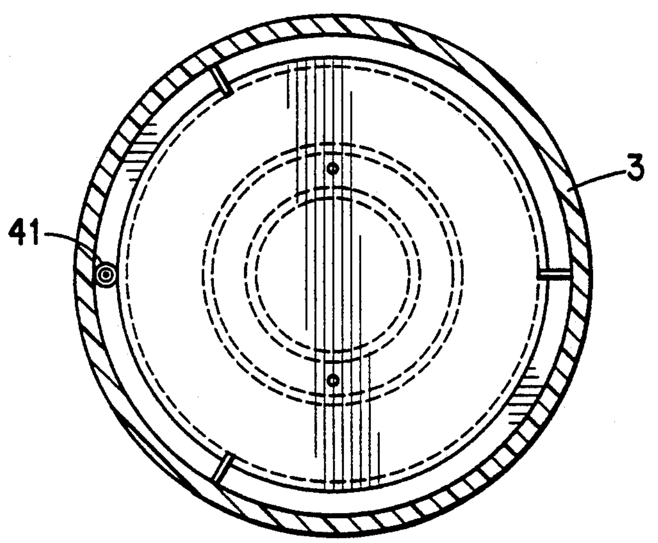

My snowflake-type display 1 has a base 3 with a transparent or translucent upper surface 4 (which can include a raised area if desired), with two concentric cylinders (with a vertical axis) mounted on top of the base. The cylinders are formed of transparent, colorless plastic and include an outer cylindrical wall 7 and an inner cylindrical wall 9. The base and the bottom of the cylindrical walls are adhered together so as to form a watertight tank 8. A lid 33 is carried on the top of tank 8 and is covered by top 5 with its downwardly extending sides 6. The sides of the base 3, and the top 5, are preferably made of opaque plastic. A lamp 11 and associated reflector 12 are mounted in base 3 to direct light upwardly.

Tank 19 carries a liquid 15 and flakes or chips 17, such as artificial snowflakes, the flakes having the same or a slightly higher specific gravity than the liquid. Falling motion of the flakes will then give the appearance of a snowstorm or other desired effect.

I have found that a liquid consisting of 45 parts distilled water, 4 parts glycerin, and 15 parts propylene glycol has the proper viscosity and works well with polystyrene chips having a specific gravity of 1.03 to 1.05 (slightly greater than the liquid). The chips measure about 0.080" by 0.080" and are 0.015" thick or less. If they are to look like snow they should be white.

The area inside the inner cylindrical wall 9 forms an object display compartment 10, for displaying an object 19, such as a soda bottle or beer bottle. Compartment 10 is sealed from tank 8 so that liquid 15 does not enter it. Consequently, object 19 can appear to be within the snowstorm caused by movement of the flakes, but actually remain dry so that its label and other parts are not subject to being deteriorated by action of the liquid.

A pump 23 is used to return the flakes 17 to the upper part of tank 8. The rotor 25 of the pump is a thin rod carrying spiral ridges 27, which I call a "spiral rotor." Spiral rotor 25 is coupled to its motor 29 by pump coupling 26 and is positioned vertically within tank 8. The spiral rotor is unencased, that is, it has no operatively associated surrounding pipe or casing. The motor is mounted on lid 33, with central opening 34, which fits over the top of tank 8. Lid 33 has a circumferential downwardly-extending step 35 which fits between the top edges of walls 7 and 9 and holds the lid in place. Motor 29 is a 2-pole shaded AC motor which operates on normal 110 volt line current and rotates the spiral rotor at 3,000 rpm. A wire 43 is carried by raceway 41 from the motor area downwardly, outside the tank 8, to lamp 11. A cooling fan is mounted above motor 29 and is operated by it.

Pump 23 is located at the back of the display so that the view of much of rotor 25 is blocked by displayed object 19. Further, when rotating, the spiral rotor appears as a single, thin vertical line, since the ridges 27 cannot be seen. As a result, rotor 25 is substantially invisible unless one looks carefully for it. In addition, there is an illusion of other vertical lines being present in the display, arising from the two cylinders 7 and 9 which refract light slightly; and these help to camouflage the rotor.

To operate the unit, tank 8 is filled with the requisite liquid and flakes, and the display object 19 is placed in object compartment 10. Lid 33, carrying pump 25, motor 29, and fan 31, is positioned over the tank, being held in place by stepped portion 35. Top 5 is placed over the unit, with its downwardly-extending sides 6 serving to cover the motor and pump unit so they cannot be seen.

Motor 29 is then turned on. This causes rotation of spiral rotor 25 and its spiral ridges 27. Rotation is in a direction such as to cause the liquid 15 adjacent to the rotor to move upwardly. Since the rotor is not encased in a casing, and, so, the liquid does not follow a well-defined channel, the upward motion of the liquid will be slow, diffuse, and non-uniform. In moving upward, the liquid carries some of the flakes upwardly. The motion of the flakes is also slow, diffuse, and non-uniform. As a result, the motion is not viewed as recirculation; and the observer does not notice that the liquid and the flakes are actually being recirculated. To the contrary, the motion is more typical of the motion one would often see in a snowstorm, with random gusts of upwardly moving snowflakes. Consequently, a more realistic effect is achieved, and the means of recirculation of the flakes is not noticed. This snowfall can be continued indefinitely with no need to agitate the tank.

Meanwhile, the displayed object 19 is in the object compartment 10, removed from contact with the liquid, and yet appears to be positioned in the middle of a snowstorm.

Both the snowflakes and the displayed object are illuminated by lamp 11.

One can produce other effects, if desired. Instead of white flakes, colored flakes can be used. Or the flakes can be coated with, or made of, material which fluoresces, i.e., glows in the presence of ultraviolet light, and lamp 11 can be an ultraviolet light. In that instance, one will have a fall of iridescent chips. Also, the tank need not necessarily be cylindrical; it could, for example, be triangular or octagonal, as long as the two walls each have a complete circumference so that the tank will hold water.

Figure 7:
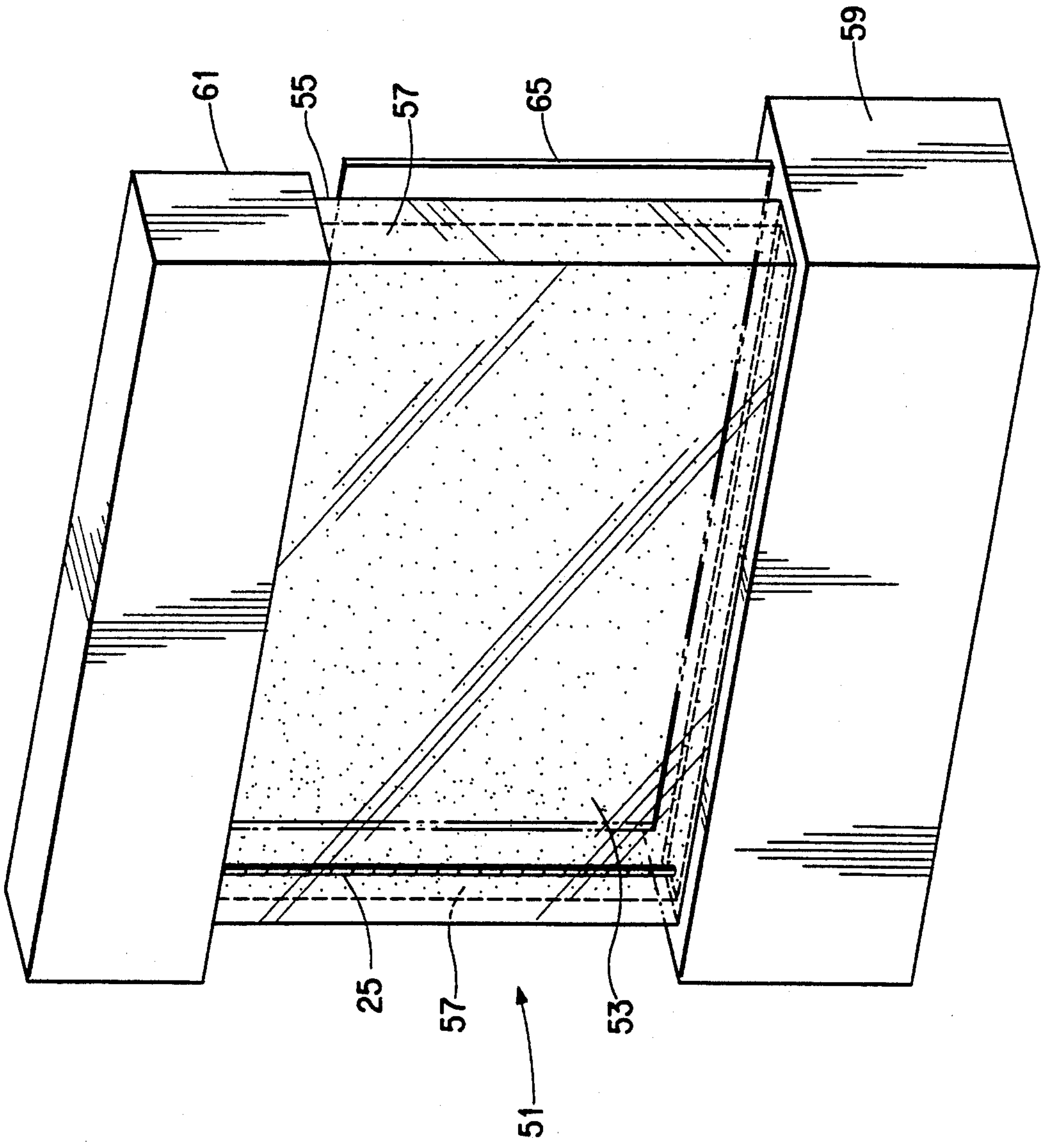
FIG. 7 is a perspective view of a modification of my invention.

A modification of my display is shown in FIG. 7. Here, instead of using two concentric cylinders to form a tank, a simple rectangular tank is used. The tank has front wall 53, back wall 55, end walls 57, base 59, and top 61. It includes a pump with a vertical spiral rotor 25 at one end of the tank. If desired, a second pump can be located at the other end of the tank. The pumps have motors as before and operate in the same way.

In this modification there is no object compartment. Rather, the displayed object, which may simply be a display card, diorama, or the like 65, is positioned behind the tank and viewed through the tank.

I claim:

1. A display device for displaying an object and for presenting the illusion that flakes are falling about the object, said display including a tank having a base, a top, and transparent sides,
liquid with flakes contained within said sides
a motor-driven pump mounted on said tank and having an unencased spiral rotor comprising an elongated roof with spiral ridges thereon, said spiral rotor projecting downwardly into said tank from said top, and said spiral ridges being at such an angle that the said spiral ridges cause said liquid in said tank to move upwardly when said pump is operating.

2. A display device as set forth in claim 1 in which said base extends horizontally beyond one said side of said tank to provide an object display area outside said tank but proximate to said one side.

3. A display device as set forth in claim 2 in which said proximate one side surrounds said object display area.

4. A display device as set forth in claim 2 in which said transparent sides are two concentric cylinders and the innermost of said concentric cylinders surrounds said object area.

5. A display device as set forth in claim 1 including liquid in said tank and flakes in said liquid.

6. A display for an object, said display providing the appearance of flakes falling about the object, said display including an outer circumferential wall, an inner circumferential wall within said outer wall, and a base positioned beneath said walls,
said walls and said base forming a liquid-tight tank, said base and the space within said inner circumferential wall defining an object display compartment,
an uncased spiral rotor vertically mounted within said tank, said spiral rotor being a rod carrying a plurality of spiral ridges, and means for rotating said rotor, and
liquid and flakes disposed in said tank and surrounding said rotor,
whereby rotation of said rotor will cause diffuse motion upwardly of portions of said liquid which are proximate to said rotor, thereby serving to recirculate said liquid and said flakes upwardly, said rotor, when rotating, appearing as a thin vertical line and being substantially invisible.

7. A display for an object as set forth in claim 6 in which said inner wall and said outer wall are cylindrical, and said walls are concentric with one another.

8. A display for an object as set forth in claim 6, said display including a lamp within said base for illuminating said flakes and for illuminating an object in said object display compartment.

9. A display for an object as set forth in claim 8 in which said lamp is an ultraviolet lamp and said flakes are of a type which fluoresce in ultraviolet light.

10. A display for and object as set forth in claim 6 in which said spiral rotor is positioned so that it will be behind said object display compartment when said display is viewed from the front.

* * * * *